(12) United States Patent
Bagare et al.

(10) Patent No.: US 7,886,222 B2
(45) Date of Patent: Feb. 8, 2011

(54) CONVERTER-TOOL FOR A NON-PROGRAMMER USER, TO GENERATE A WEB BASED APPLICATION

(75) Inventors: Jayanth Bagare, Bangalore (IN); Pranav K Wankawala, Surat (IN); Suraj Sudhi, Kerala (IN)

(73) Assignee: SAP AG, Walldorf (DE)

( * ) Notice: Subject to any disclaimer, the term of this patent is extended or adjusted under 35 U.S.C. 154(b) by 909 days.

(21) Appl. No.: 11/351,048

(22) Filed: Feb. 9, 2006

(65) Prior Publication Data

US 2007/0186156 A1 Aug. 9, 2007

(51) Int. Cl.
G06N 3/00 (2006.01)
(52) U.S. Cl. ...................................................... 715/234
(58) Field of Classification Search ................... 715/234, 715/243, 254, 255
See application file for complete search history.

(56) References Cited

U.S. PATENT DOCUMENTS

| | | | |
|---|---|---|---|
| 6,668,354 B1 * | 12/2003 | Chen et al. | 715/255 |
| 2002/0010716 A1 * | 1/2002 | McCartney et al. | 707/517 |
| 2004/0039990 A1 * | 2/2004 | Bakar et al. | 715/505 |
| 2005/0058260 A1 * | 3/2005 | Lasensky et al. | 379/1.03 |
| 2006/0218527 A1 * | 9/2006 | Nagendra | 717/117 |

OTHER PUBLICATIONS

Helm et al., "An Approach for Totally Dynamic Forms Processing in Web-Based Applications," 2001, pp. 1-4.*

* cited by examiner

Primary Examiner—Kyle R Stork
(74) Attorney, Agent, or Firm—Kenyon & Kenyon LLP

(57) ABSTRACT

A method of developing a software prototype for and by a non-programmer user enters user-inputs into a UI in natural language including documentation requirements and user's business logic. The UI has access to a database, and optionally to text files, spreadsheets, data in xml format and user's business logic information. A parser tool is used for automatically parsing user-inputs into easily processed software components and for automatically converting said inputs into an XML (Extensible Mark up Language) document. The XML document is converted into a XSLT document to form data base tables, and, the user selectively initiates validation, data retrieval and information storage. The user-input may be partially a voice input, assisted by a voice-to-text converter. The inputs may use the help of an AI robot. A user without any programming knowledge can create a software application which may be in real time, without any intermediary professional software help.

17 Claims, 4 Drawing Sheets

FIG 4

| User Definition |
|---|
| Username: [          ] |
| Password: [          ] |
| [ Save ]     [ Clear ] |

CONVERTER-TOOL FOR A NON-PROGRAMMER USER, TO GENERATE A WEB BASED APPLICATION

FIELD OF THE INVENTION

The present invention generally relates to a software tool for use by a non-programmer user to generate documentation, and more particularly to a software tool which enables the user to develop a software prototype form inputs in plain language to provide a text to application converter.

BACKGROUND OF THE INVENTION

Customers who are not proficient in software and are in small market segments have usually no easily accessible means by which to create software mini-applications that cater to their requirement to capture data for their day to day activities. They generally encounter two problems with respect to software applications they need for their business. They generally need to approach a software consultant or a software provider to evaluate their requirements and business needs and develop a software application for them at short notice. Notwithstanding, the software application so created would miss on some of the requirements, and furthermore, there may be an additional overhead for customers to maintain the software application developed by using professional help.

During the design phase and during the study of the requirements, software vendors are often at a loss to capture the feel of the application which is to be developed, based on the requirements and the customer's business needs. Thus, an additional tier is introduced wherein the requirements specified and business logic stated by the customer have to be understood well by the software consultants who in turn will have to decode the requirements to programmers who finally design the prototype. In the whole process, the effort might result in loss of valuable time, effort and money, and cause considerable delay.

SUMMARY OF THE INVENTION

The invention address the forgoing problems faced by business customers and offers an application-to-text converter that can overcome the problems addressed above. The invention provides a text-to application converter where a dynamic web-based application is created based on user requirements entered into the system with database access, by the user in plain language, e.g., in a document editor such as a note pad.

In the context of creating web-based applications, reference may be had to the white paper titled "An approach for totally dynamic forms processing in Web Based Applications", by Daniel J. Helm and Bruce W. Thompson of The Mitre Corporation, 1820, Dolly Madison Boulevard, McLean, Va. 22102, US, which is herein incorporated by reference.

The user requirements are entered in plain non-software language preferably with predefined keywords and styles into a UI. The UI has access not only to a database but optionally also to text files, spreadsheets, data represented in xml format, and generally any information which is related to the user's business logic and business interests. As a variation and expediently, the natural language for user input can be used in conjunction with an AI bot (Artificial Intelligence Robot) to convert the natural language to the basic language which will then be parsed using the text parser. The text parser uses keywords and styles to create an XML (Extensible Mark up Language) document converting the keywords and styles to pre-defined tags. If there already exists an XSLT (Extensible Style sheet Language Transformation) page for the XML document, then the XML document is converted to a web-based application. Otherwise the XML document is converted to form database table which are then used by the web application parser to create dynamic application forms. The user can then initiate validations, data retrieval and data storage as desired. As an alternative to the user entering the user information input in plain language, the user input may be entered at least partly in voice form, in which case, a voice-to text converter is used in the process. User inputs in other forms such as images and readable thought/brain waves are also envisaged, in which case suitable converters for transforming the inputs into language that can be parsed needs to be deployed. The modus operandi of processing inputs in such form is known to those skilled in the art.

The invention in one form resides in a method of using a software converter tool, for use by a non-programmer user for generating user documentation, comprising the steps of: the user entering inputs including documentation requirements in plain language into a user interface (UI) of a system which has data base access; using a parser which is part of the tool, for automatically parsing and converting the inputs into easily processed software components and an XML document; checking to see if an XSLT for the XML document already exists in the system; if negative, automatically converting the XML document into the XSLT document to form data base tables; and, the user selectively initiating validation, data retrieval and information storage of said documentation.

The invention in another form resides in a method of developing a software prototype for and by a non-programmer user from user-inputs including documentation requirements and user's business logic, said user-inputs being entered in natural language by the user interacting with a UI which has database access, comprising the steps of: using a parser tool in conjunction with the UI for automatically parsing the user inputs into easily processed software components and for automatically converting the user-inputs into an XML (Extensible Mark up Language) document; checking to see if an XSLT (Extensible Style sheet Language Transformation) for said XML document already exists in said system; if negative, automatically convert the XML document into the XSLT document to form data base tables. The XSLT document optionally covers UI descriptions including widgets, desktop screen and the like. The user selectively initiates validation, data retrieval and information storage of the documentation.

It is understood that modifications in the software prototype development method as depicted above are possible without departing from the thrust of the described process and are within the ambit of the present invention.

BRIEF DESCRIPTION OF THE DRAWING

A more detailed understanding of the invention may be had from the following description of a preferred embodiment, given by way of example and to be understood in conjunction with the accompanying drawing wherein:

FIG. 4 is an illustration of an exemplary final screen output.

DETAILED DESCRIPTION

In the following detailed description of the various embodiments of the invention, reference is made to the accompanying drawings that form a part hereof, and in which are shown by way of illustration specific embodiments in which the invention may be practiced. These embodiments are described in sufficient detail to enable those skilled in the art to practice the invention, and it is to be understood that other embodiments may be utilized and that changes may be made without departing from the scope of the present invention. The following detailed description is therefore not to be taken in a limiting sense, and the scope of the present invention is defined only by the appended claims. The user, based on user-inputs provided in plain language is able to create a dynamic software application using the dynamic application generator implemented in the invention.

Figure 1:
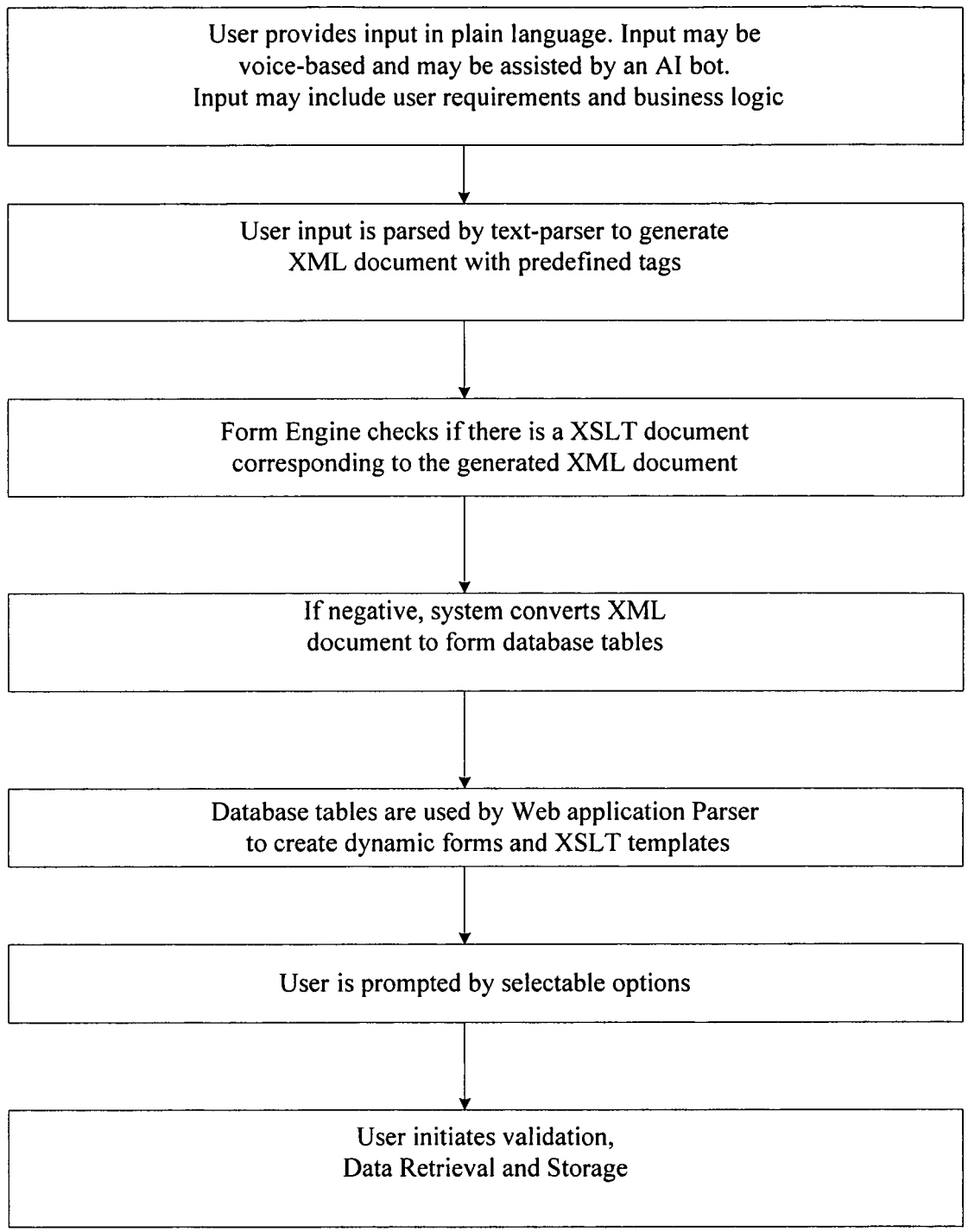
FIG. 1 is an exemplary flowchart illustrating the steps taken in the software prototype development method described.

With specific reference to FIG. 1, the following exemplary sequence of steps may be followed in the implementation of the invention. It is to be noted that the precise description of the steps and the exact sequence may be tailored and modified to suit the user's requirements:

User provides input in plain language. Input may be voice-based and may be assisted by an AI bot.

Input may include user requirements and business logic.

User input is parsed by text-parser to generate XML document with predefined tags.

Form Engine checks if there is a XSLT document corresponding to the generated XML document.

If negative, system converts XML document to form database tables.

Database tables are used by Web application Parser to create dynamic forms and XSLT templates.

User is prompted by selectable options.

User initiates validation, Data Retrieval and Storage.

The above sequence and the specific description of each step may be modified within the ambit of the invention, so as to enable a user to implement an application-converter to create a tailored/configurable software mini-application.

Figure 2:
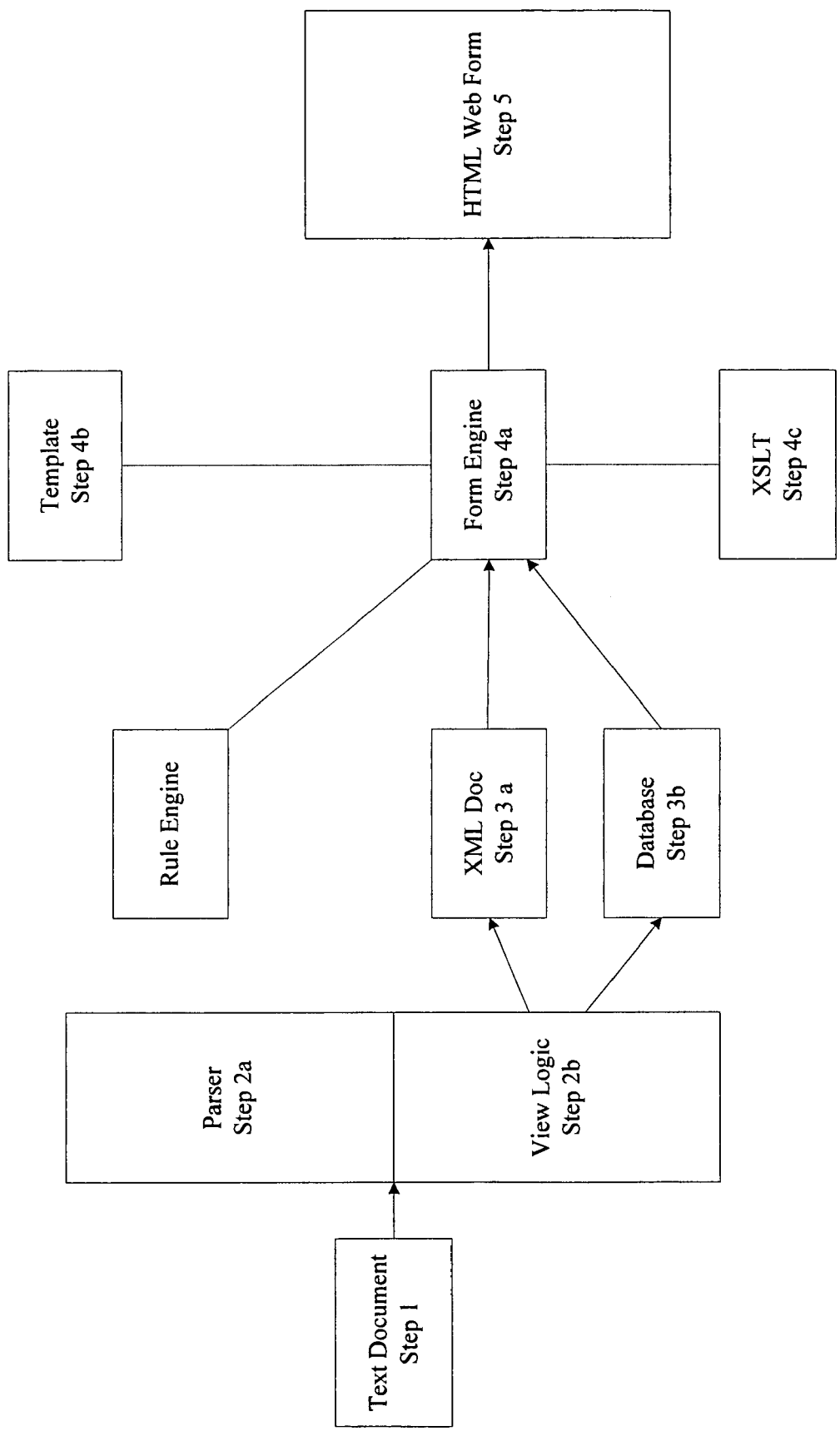
FIG. 2 is an exemplary flow diagram of a dynamic application generator used in the present invention; and, FIG. 3 is an illustration of a general purpose computing platform which can be used in the implementation of this invention.

With specific reference to FIG. 2, the following is a rendition of the exemplary flow diagram steps showing the function of a Dynamic Application Generator which can be implemented in the method described:

Step 1: A text document is written using a simple text editor, with a certain syntax which is close to the Natural Language (in this case English). This language comprises of both the basic level and the advanced level. The basic level will enable the creation of applications with UI elements having predefined properties and predefined look and feel. Basic business logic (like insert, update, delete, search of data) will also be handled. The advanced level of the language will modify the predefined properties of the elements for flexibility and customized functionality. Advanced validations can also be incorporated.

An example of the basic language is as follows. The excerpt below is an example of how a requirement document would be written:

User Definition Screen

Screen to "User Definition". User entry (single) of "Username" and "Password". "Save" "Username" and "Password" Success message "Data is saved successfully". Failure message "Data couldn't be saved". "Clear" "Username" and "Password".

The parser would recognize that a screen has to be created with the title "User Definition" by reading the keyword screen and the screen needs to have two fields for data entry called "Username" and "Password" This is done by the presence of the phrase 'user entry'. The fields by default will be mandatory and the "Password" field value will be invisible. The option 'single' will enable the parser to know that the user is requesting the entry in the fields to be single and hence an edit text will be provided. The keyword 'Save' means the user needs to save the entry in the fields "Username" and "Password" to a database table. Since save is an action it will be represented by a button of the label "Save". Success will show a success message. Failure will show an error message to the user. "Clear" is an action of clearing all the fields and is denoted by a button of the label "Clear".

The exemplary final screen output is illustrated in FIG. 4.

As an enhancement and as stated earlier, natural language can be used in conjunction with an Artificial Intelligence Robot (AI bot) to convert the natural language to the basic language or advanced language which will then be parsed using the text parser. In addition, this invention can be extended to include partly or wholly voice based application creation. The user's voice will be converted to text using a voice to text converter and the rest of the process remains the same. As stated earlier, user input in other forms such as images and readable thought/brain waves are also envisaged to be within the ambit of the invention, in which case suitable converters for transforming the inputs need to be used. An example of user input in such form is virtual reality input which will be converted to text.

Step 2a: A text parser parses the text document, and picking up key words such as screen, field, field name button, link etc., would have 2 options Step 2b:

a) The user with the help of the system View Logic generates an XML file which has the following structure:

```
<form name = "USERDEFINTION">
    <field1 name ="Username" Type = "Text" Label="User Name">
        <rule>
            <visible>Y</visible>
            <enabled>Y</enabled>
            <mandatory>Y</mandatory>
        </rule>
    </field1>
    <field2 name ="Password" Type = "Password" Label="Password">
        <rule>
            <visible>N</visible>
            <enabled>Y</enabled>
            <mandatory>Y</mandatory>
        </rule>
    </field2>
    <field3 name="Save" Type = "Submit" Label="Save">
        <rule>
            <visible>Y</visible>
            <enabled>Y</enabled>
        </rule>
    </field4>
        <field4 name="Clear" Type = "Reset" Label="Clear">
            <rule>
                <visible>Y</visible>
                <enabled>Y</enabled>
            </rule>
    </field4>
</form>
```

This is the XML output which would be generated out of the view logic section of the parser. The XML is generated only if the XML generation is switched on in the configuration file, else as a default the contents parsed are going to be stored in the database in a sample table format as given below.

1 FORM_NAME—Userdefinition

2 FIELD_NAME—Username

3 FIELD_DESC—Username

4 DEFAULT_VALUE—NULL

5 VISIBLE—Y

6 ENABLED—Y

7 FIELD_TYPE—Text

8 MANDATORY—Y

9 DATATYPE—VARCHAR

10 SIZE—10(By default)

11 DYNAMIC_QUERY—NULL

12 ROW—NULL

13 COLUMN—NULL

14 LIST_MULTIPLE—NULL

15 RELATED_TABLE—Userdefinition

16 RELATED_FIELD—Username

Each field will be entered into the above table as a separate row.

Step 3a represents the XML document, and step 3b represents the Database.

Step 4a: The control is then passed to the generic form engine, which recognizes the format sent (XML or database store) and then calls for a generic template (a) which is stored, either as an XSLT or (b) as a standard template defined as seen in the Annex. The form engine would then pick up the required elements from either the input source as database or an XML file and then combine the template and the required basic client validation from the rule engine and generate a dynamic HTML form, with the client side validation as JavaScript®. Step 4b represents the Template and Step 4c represents the XSLT.

The form engine (see 4a in FIG. 2) in the system checks whether already a database-table/tables exist as the underlying structure and if not, proceeds to create a database table/tables as the underlying structure for the form. The form engine (4a in FIG. 2) then further proceeds to check if the class for this particular form exists as a generic object which would be needed to handle the data inputted in the form and also allow the business logic to work on the same. Once the class is created, just before the HTML form is shown to the user in Step 5, the engine calls the Generic Object Creator, which instantiates an object, and populates it with the default values, which would give rise to a form which is ready to accept data.

Post Form: Once the user completes the form, he clicks the save button, (see Annexure 2 for a form screen.) which means the data entered is validated at the client side, which is a dynamically written JavaScript Code and then uses the generic objects which are created and populated to transport and save the data in the database.

Similar functionality can be built for querying for data, modifying and deleting data.

This being an application generator would also handle multiple forms linked to each other to generate a complete transaction for a single business process.

The following Annex illustrates an exemplary template for HTML-form generation for use in the invention:

Annex: Template for HTML-Form Generation:

```
<HTML>
<HEAD>
<TITLE>
    Address Book
</TITLE>
{Userdefinition_javascript}
</HEAD>
<BODY>
<form {USERDEFINITION_attributes}>
{USERDEFINITION_session_html}
<table border="0" cellpadding="0" cellspacing="1" width="1040" height="372">
    <tr>
        <td width=10% height="19"> <font face="Arial" size="2">
{USERDEFINITION_Username_label}</font></td>
        <td height="19"> <font face="Arial" size="2">
{USERDEFINITION_Username_html}</font></td>
        <td height="19"></td>
        <td height="19"></td>
    </tr>
    <tr>
        <td height="16"><font face="Arial"
size="2">{USERDEFFNITION_Password_label}</font></td>
        <TD height="16"><font face="Arial"
size="2">{USERDEFINITION_Password_html}</font> </TD>
    <tr>
        <td width="248" height="19">
<font face="Arial"
size="2">{USERDEFINITION_save_html} </font><font
face="Arial" size="2">{USERDEFINITION_clear_html}</font></td>
</FORM></BODY>
```

The foregoing exemplary embodiment of the inventive method overcomes the inherent disadvantage that a layman cannot easily develop a software mini-application to generate a dynamic form of document without external programming skills. The approach described above enables the user to enter user-requirements in plain language only, to generate dynamic forms of document with the necessary functionality. The invention may be used by a non-software oriented user at least for the following purposes:

1) To develop a software prototype in real time, of a complex application based on user requirements, specifications and business logic.

2) To generate relatively small software applications that do not involve heavy business logic, rapidly and almost instantaneously with little or no programming skills.

Figure 3:
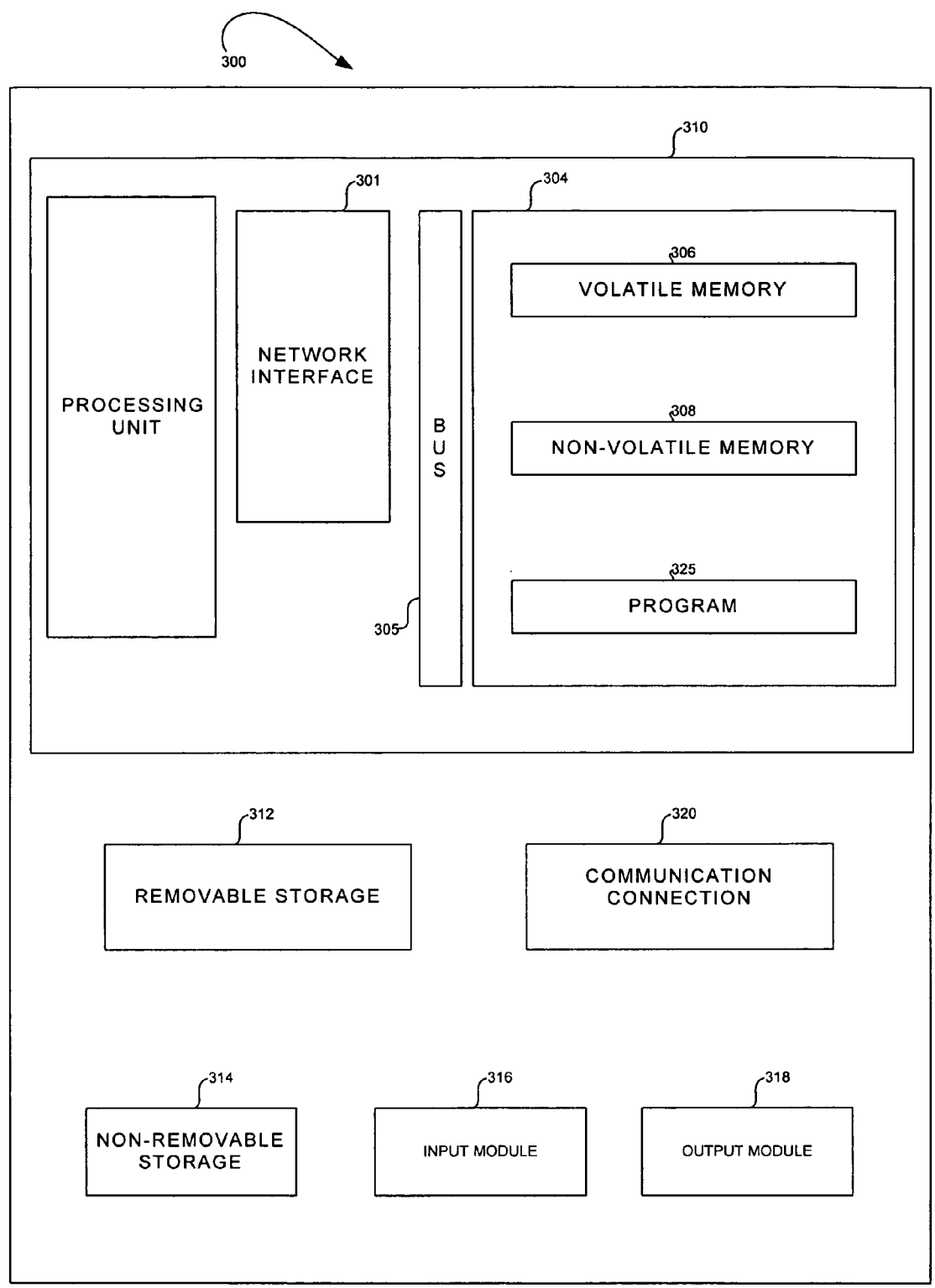

Various embodiments of the present subject matter can be implemented in software, which may be run in the environment shown in FIG. 3 or in any other suitable computing environment. The embodiments of the present subject matter are operable in a number of general-purpose or special-purpose computing environments. Some computing environments include personal computers, general-purpose computers, server computers, hand-held devices (including, but not limited to, telephones and personal digital assistants (PDAs) of all types), laptop devices, multi-processors, microprocessors, set-top boxes, programmable consumer electronics, network computers, minicomputers, mainframe computers, distributed computing environments and the like to execute code stored on a computer-readable medium. It is also noted that the embodiments of the present subject matter may be implemented in part or in whole as machine-executable instructions, such as program modules that are executed by a computer. Generally, program modules include routines, programs, objects, components, data structures, and the like to perform particular tasks or to implement particular abstract data types. In a distributed computing environment, program modules may be located in local or remote storage devices.

FIG. 3 shows an example of a suitable computing system environment for implementing embodiments of the present subject matter. FIG. 3 and the following discussion are intended to provide a brief, general description of a suitable computing environment in which certain embodiments of the inventive concepts contained herein may be implemented.

A general computing device in the form of a computer 310 may include a processing unit 302, memory 304, removable storage 312, and non-removable storage 314. Computer 310 additionally includes a bus 305 and a network interface (NI) 301. Computer 310 may include or have access to a computing environment that includes one or more user input devices 316, one or more output modules or devices 318, and one or more communication connections 320 such as a network interface card or a USB connection. The one or more user input devices 316 can be a touch screen and a stylus and the like. The one or more output devices 318 can be a display device of computer, computer monitor, TV screen, plasma display, LCD display, display on a touch screen, display on an electronic tablet, and the like. The computer 310 may operate in a networked environment using the communication connection 320 to connect to one or more remote computers. A remote computer may include a personal computer, server, router, network PC, a peer device or other network node, and/or the like. The communication connection may include a Local Area Network (LAN), a Wide Area Network (WAN), and/or other networks.

The memory 304 may include volatile memory 306 and non-volatile memory 308. A variety of computer-readable media may be stored in and accessed from the memory elements of computer 310, such as volatile memory 306 and non-volatile memory 308, removable storage 312 and non-removable storage 314. Computer memory elements can include any suitable memory device(s) for storing data and machine-readable instructions, such as read only memory (ROM), random access memory (RAM), erasable programmable read only memory (EPROM), electrically erasable programmable read only memory (EEPROM), hard drive, removable media drive for handling compact disks (CDs), digital video disks (DVDs), diskettes, magnetic tape cartridges, memory cards, Memory Sticks™, and the like, chemical storage, biological storage, and other types of data storage.

"Processor" or "processing unit," as used herein, means any type of computational circuit, such as, but not limited to, a microprocessor, a microcontroller, a complex instruction set computing (CISC) microprocessor, a reduced instruction set computing (RISC) microprocessor, a very long instruction word (VLIW) microprocessor, explicitly parallel instruction computing (EPIC) microprocessor, a graphics processor, a digital signal processor, or any other type of processor or processing circuit. The term also includes embedded controllers, such as generic or programmable logic devices or arrays, application specific integrated circuits, single-chip computers, smart cards, and the like.

Embodiments of the present subject matter may be implemented in conjunction with program modules, including functions, procedures, data structures, application programs, etc., for performing tasks, or defining abstract data types or low-level hardware contexts.

Machine-readable instructions stored on any of the above-mentioned storage media are executable by the processing unit 302 of the computer 310. The computer 310 might operate as a single unit or in conjunction with other computers as desired. For example, a computer program 325 may include machine-readable instructions capable of developing a software prototype of a complex application based on user inputs and user's business logic inputs, as taught hereinabove. In one embodiment, the computer program 325 may be included on a CD-ROM and loaded from the CD-ROM to a hard drive in non-volatile memory 308. The machine-readable instructions cause the computer 310 to decode according to the various embodiments of the present subject matter.

The foregoing is the description of exemplary implementations of an exemplary dynamic software application generation from user documentation, which does not require the user to be programmer nor software proficient. The description hereinabove is intended to be illustrative, and not restrictive.

The various choices, steps and parameters used in the exemplary method of creating a dynamic web based application described hereinabove are only by way of example, and in no way intended to limit the applicability of the invention. In addition, the techniques of the various exemplary embodiments are useful to the design of any hardware implementations of software, firmware, and algorithms in the context of motion estimation in general.

Many other embodiments will be apparent to those skilled in the art. For example, the configuration and flow diagram for the Dynamic Application Generator might be different from the one illustrated in FIG. 2. Different types of voice-to text converters may be used in the implementation of the invention if the user input is at partly in voice form. The database which is linked to the UI may be located at the site of the user, or may be remotely located and may even be shared by other users. Several different approaches to the form of providing the user inputs, and parsing from the user's plain language input may be used in implementing the invention. The scope of this invention should therefore be determined not simply by the described embodiments, but by the appended claims as supported by the text, along with the full scope of equivalents to which such claims are entitled.

The invention claimed is:

1. A method of using a computer-implemented converter tool, for use by a non-programmer user for generating user documentation, comprising the steps of:
    receiving, from the user, inputs including documentation requirements in plain language into a user interface (UI) of a system which has database access;
    receiving, from the user, performance requirements with predefined keywords and styles;
    parsing the inputs by the tool;
    converting the parsed inputs into software components and an XML (Extensible Mark up Language) document;
    determining if an XSLT (extensible Style sheet Language Transformation) for the XML document already exists in the system;
    if no XSLT exists in the system, automatically converting the XML document into the XSLT document to form database tables;
        receiving, from the user, selectively initiated validation, data retrieval and information storage of the documentation; and
    if an XSLT document already exists in the system, converting the XML document into a web based application by converting the key words and styles to predefined tags.

2. The method as in claim 1, comprising receiving, from the user, inputs chosen from at least partly voice inputs and virtual reality inputs.

3. The method as in claim 2, further comprising using a voice-to-text converter to assist in the system accepting voice inputs.

4. The method as in claim 1, wherein the step of receiving inputs, from the user, comprises using natural language inputs and user's business logic inputs selectively in conjunction with an AI robot to assist converting the natural language into a basic desired software language.

5. The method as in claim 1, further comprising generating dynamic forms from the web based application, wherein the XSLT document covers UI descriptions comprising widgets and a desktop screen.

6. The method as in claim 1, further comprising prompting the user to select from options available on the UI in generating user documentation, the UI having additional access to predetermined files including text files, spreadsheets, data represented in XML format, and generally any information which is related to user's business logic and business interests.

7. The method as in claim 1, wherein the parsing identifies key words including screen, field, field name button and link.

8. The method as in claim 1, further comprising generating the user documentation in real time.

9. The method as in claim 1, further comprising receiving, from the user, inputs chosen from at least partly voice inputs and virtual reality inputs.

10. The method as in claim 9, further comprising a voice-to-text converter to assist in the system accepting voice inputs.

11. A method of developing a software prototype for use by a non-programmer user, comprising the steps of:
   receiving, from the user, inputs including documentation requirements and the user's business logic, in natural language;
   receiving, from the user, performance requirements with predefined keywords and styles;
   parsing the inputs by the tool in conjunction with a UI having database access,
   converting the inputs into an XML (Extensible Mark Up Language) document;
   determining if an XSLT (extensible Style sheet Language Transformation) for the XML document already exists in the system;
   if no XSLT exists in the system, automatically converting the XML document into the XSLT document to form database tables;
   receiving, from the user selectively initiated validation, data retrieval and information storage of the documentation; and
   if an XSLT document already exists in the system, converting the XML document into a web based application by converting the key words and styles to predefined tags.

12. The method as in claim 11, further comprising entering user inputs in natural language selectively in conjunction with an AI robot to assist converting the natural language into a basic desired software language.

13. The method as in claim 11, further comprising, generating dynamics forms from the web based application.

14. The method as in claim 11, further comprising prompting the user to select from options available on the UI in generating user documentation.

15. The method as in claim 11, wherein the parsing identifies key words including screen, field, field name button and link.

16. The method as in claim 11, further comprising generating the user documentation in real time.

17. An article comprising a storage medium having instructions thereon which when executed by a computing platform results in execution of a method for developing a software prototype for use by a non-programmer user, comprising the steps of:
   receiving, from the user, inputs including documentation requirements and the user's business logic in natural language,
   receiving, from the user, performance requirements with predefined keywords and styles;
   parsing the inputs by the tool in conjunction with a UI having database access,
   converting the inputs into an XML (Extensible Mark Up Language) document;
   determining if an XSLT (extensible Style sheet Language Transformation) for the XML document already exists in the system;
   if no XSLT exists in the system, automatically converting the XML document into the XSLT document to form database tables;
   receiving, from the user selectively initiated validation, data retrieval and information storage of the documentation; and
   if an XSLT document already exists in the system, converting the XML document into a web based application by converting the key words and styles to predefined tags.

* * * * *